B. SANDSTROM.
LAND SCRAPER OR LEVELING MACHINE.
APPLICATION FILED JULY 12, 1919.
1,343,159.   Patented June 8, 1920.
2 SHEETS—SHEET 2.
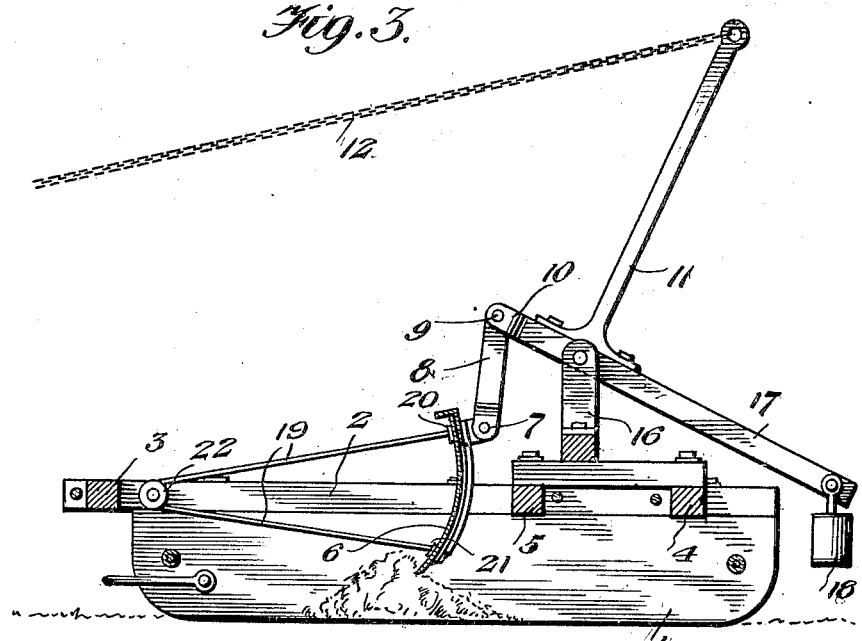
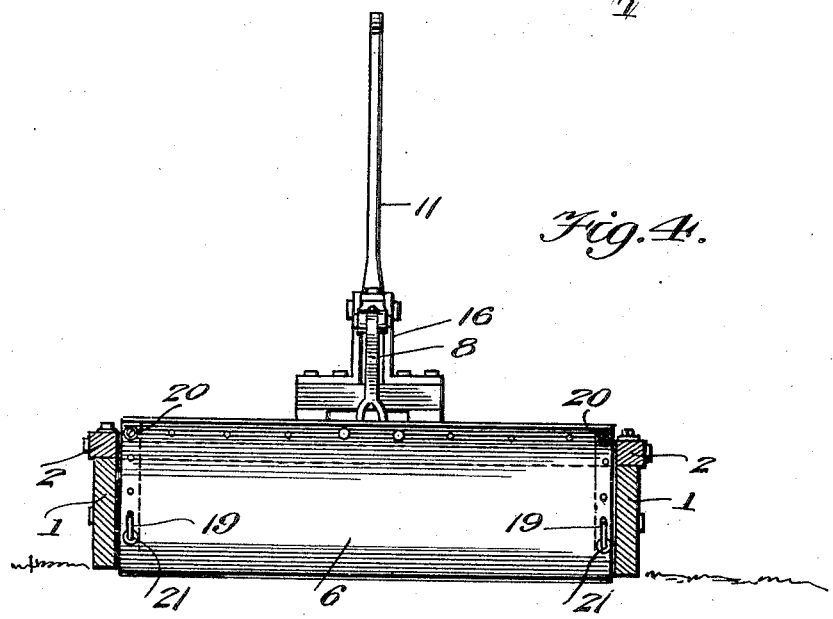
WITNESS:   INVENTOR.
Geo. Ackman Jr.   BY Barney Sandstrom
   Victor J. Evans
   ATTORNEY.

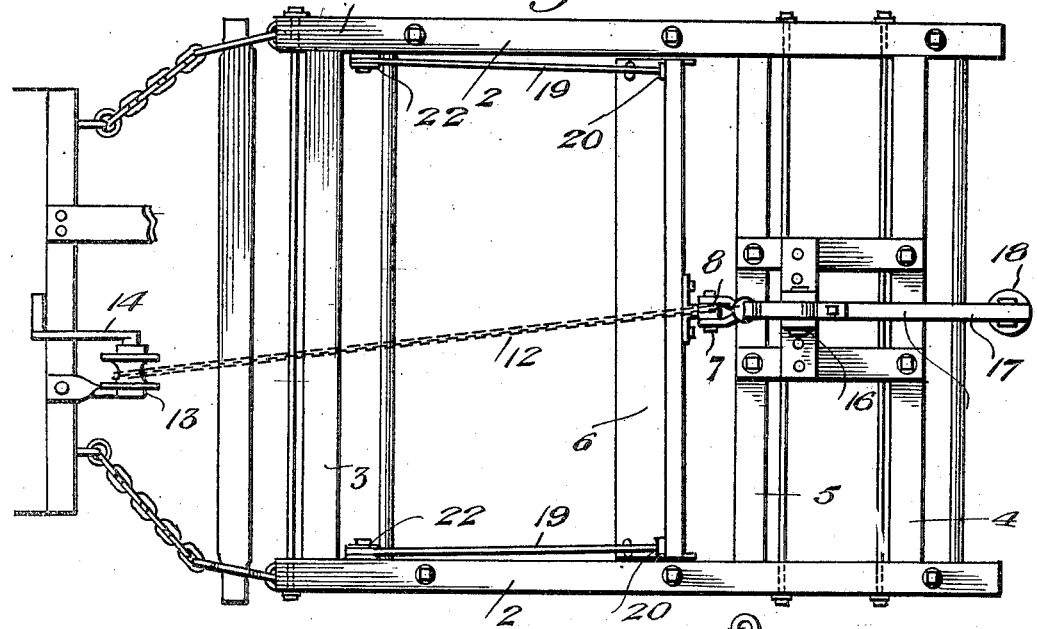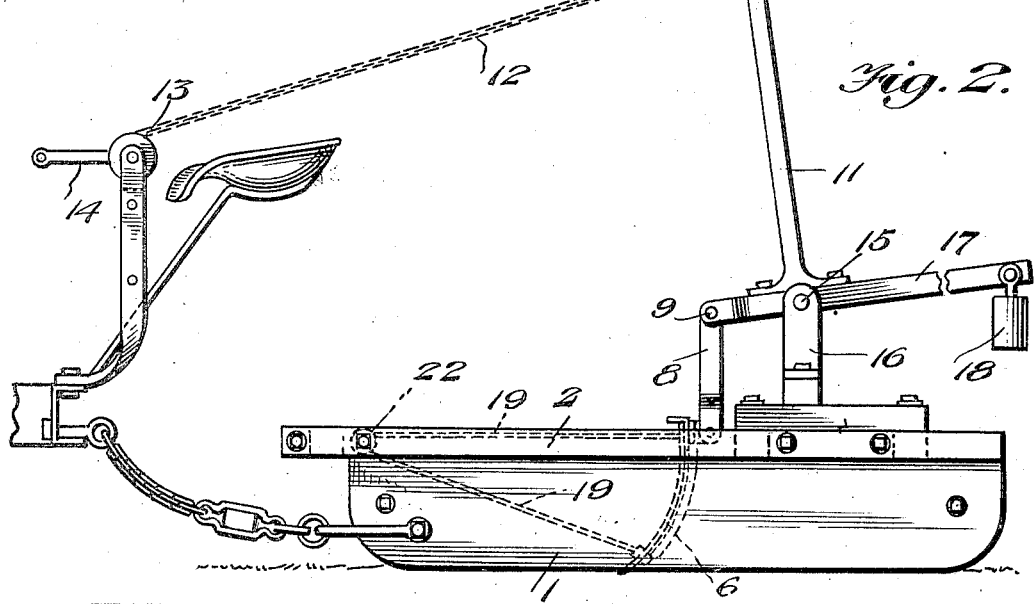

UNITED STATES PATENT OFFICE.

BARNEY SANDSTROM, OF SULTANA, CALIFORNIA.

LAND-SCRAPER OR LEVELING-MACHINE.

1,343,159.  Specification of Letters Patent.  Patented June 8, 1920.

Application filed July 12, 1919. Serial No. 310,371.

*To all whom it may concern:*

Be it known that I, BARNEY SANDSTROM, a citizen of the United States, residing at Sultana, in the county of Tulare and State of California, have invented new and useful Improvements in Land-Scrapers or Leveling-Machines, of which the following is a specification.

This invention relates to land scrapers or leveling machines, the object in view being to provide an especially efficient machine of the character referred to which embodies an adjustable scraper blade mounted in such a way that it may be raised and lowered for gathering and dumping dirt scraped from the surface of the ground, novel bracing or staying means being employed for supporting said scraper in working position, irrespective of the degree of elevation of the bottom or scraping edge thereof.

With the above and other objects in view, the invention consists in the construction, combination and arrangement of parts, as herein described, illustrated and claimed.

In the accompanying drawings:

Figure 1 is a plan view of the machine.

Fig. 2 is a side elevation of the same.

Fig. 3 is a vertical longitudinal section through the machine.

Fig. 4 is a vertical transverse section through the machine adjacent to the scraper blade.

The machine in a simple embodiment thereof comprises a pair of runners or supports 1 arranged in spaced parallel relation to each other, the distance between the runners 1 being governed by the nature of the work to be performed and the power available for dragging the machine. The machine may be made sufficiently small so that it may be drawn by draft animals or it may be made of as large a size as a traction engine of given horse power will draw.

The runners 1 support a superimposed rectangular frame comprising longitudinal bars 2 which are fastened directly upon the runners 1 and front and rear cross bars 3 and 4 as well as an intermediate cross bar 5, said cross bars being fixedly secured at their ends to the longitudinal side bars 2.

6 designates a transversely extending forwardly curving scraper blade, the bottom edge of which is adapted to scrape the surface of the ground. The scraper blade 6 is fastened along its top edge to a hanger rod or shaft 7 and extending upwardly from the latter is a central arm 8 which is connected by a pivot 9 to the forwardly extending short arm 10 of a bell crank lever comprising an upright operating arm 11. A scraper blade raising and lowering connection 12 such as a chain or cable is attached at one extremity to the upper end of the lever arm 11 and is connected at its forward extremity to a pulley 13 having on the shaft thereof an operating crank handle 14 arranged within reach of the driver of the traction engine who may thereby easily swing the lever arm 11 for raising and lowering the scraper blade. The bell crank lever is mounted pivotally at 15 on a fulcrum post 16 extending upwardly from the intermediate cross bar 5 of the frame of the machine. In addition to the arms 10 and 11 the bell crank lever comprises a rearwardly extending counterbalancing arm 17 to the rear extremity of which is attached a weight 18 of sufficient size to practically counter balance the weight of the scraper blade 6 and enable the operator of the traction engine to raise and lower the scraper blade or maintain the same at any desired elevation.

By means of the construction described, the scraper blade 6 may be lowered to scrape off a mound or rise in the ground and may thereafter be raised to allow the earth to clear the same and fill a hole or depression in the ground, only a slight movement and a small amount of physical exertion being required on the part of the operator. Flexible stays 19, such as cables or chains, have their rear extremities attached to the scraper blades 6 at the points 20 and 21 located in vertical spaced relation to each other, the central portion of each of said stays 19 passing around a pulley 22 arranged a considerable distance in advance of the scraper blade. The stays 19 are thus self-adjusting and serve to sustain the scraper blade in working position irrespective of the height of the working edge thereof.

I claim:—

1. In a land scraper, the combination of a normally horizontal frame, supporting means for said frame, a fulcrum post rising from said frame, a scraper blade extending transversely of and within said frame and between the supporting means for said frame, a raising and lowering lever to one arm of which said scraper blade is pivotally attached, a weighted blade counter balancing arm extending from said lever, and a flexible operating connection attached to said operating lever.

2. In a land scraper, the combination of a normally horizontal frame, supporting means for said frame, a fulcrum post rising from said frame, a scraper blade extending transversely of and within said frame and between the supporting means for said frame, a raising and lowering lever to one arm of which said scraper blade is pivotally attached, a weighted blade counter balancing arm extending from said lever, a flexible operating connection attached to said operating lever, and self-adjusting flexible stays extending from vertically spaced points on said scraper blade around pulleys located in advance of said scraper blade.

3. In a land scraper, the combination of a normally horizontal frame, supporting means for said frame, a fulcrum post rising from said frame, a scraper blade extending transversely of and within said frame and between the supporting means for said frame, a raising and lowering lever to one arm of which said scraper blade is pivotally attached, a weighted blade counter balancing arm extending from said lever, a flexible operating connection attached to said operating lever, a hanger rod extending along the top of said scraper blade, and a central arm rising from said hanger rod and pivotally attached to an arm of said operating lever.

In testimony whereof I affix my signature.

BARNEY SANDSTROM.